United States Patent [19]

Brash et al.

[11] Patent Number: 4,797,709
[45] Date of Patent: Jan. 10, 1989

[54] INTEGRATED SCANNER/PLOTTER FOR MICROFILM APERTURE CARDS

[75] Inventors: Robert A. D. Brash, Fishers Pond; Anthony J. Wicks, Meadow Cottage; Eric T. Wilson, Medstead, all of United Kingdom

[73] Assignee: Wicks & Wilson Limited, Basingstoke, United Kingdom

[21] Appl. No.: 106,147

[22] Filed: Oct. 8, 1987

[30] Foreign Application Priority Data

Oct. 9, 1986 [GB] United Kingdom ............... 8624263

[51] Int. Cl.⁴ .................... G03B 27/32; G03B 27/52
[52] U.S. Cl. ................................. 355/27; 355/50; 355/64
[58] Field of Search ............... 355/27, 50, 51, 64, 355/65

[56] References Cited

U.S. PATENT DOCUMENTS 3,334,539  8/1967  Kleist et al. ............... 355/64 X
3,528,355  9/1970  Blackert ..................... 355/64 X
4,551,012 11/1985  Schaut et al. ................... 355/50

Primary Examiner—Richard A. Wintercorn
Attorney, Agent, or Firm—Phillips, Moore, Lempio & Finley

[57] ABSTRACT

A microfilm aperture and handling machine has punched card reading and punching means, single means capable of both scanning and plotting microfilm images, a photographic developer station for developing plotted images, and control means enabling selective operation to read existing data carried by a card or to create data on a previously blank card. The machine integrates functions normally found only in separate machines. The single scanner/plotter means scans a microfilm image from the central axis of a cylindrical platen. The developer station injects chemicals into a chamber of which the microfilm emulsion area forms one wall by peripheral clamping.

15 Claims, 10 Drawing Sheets

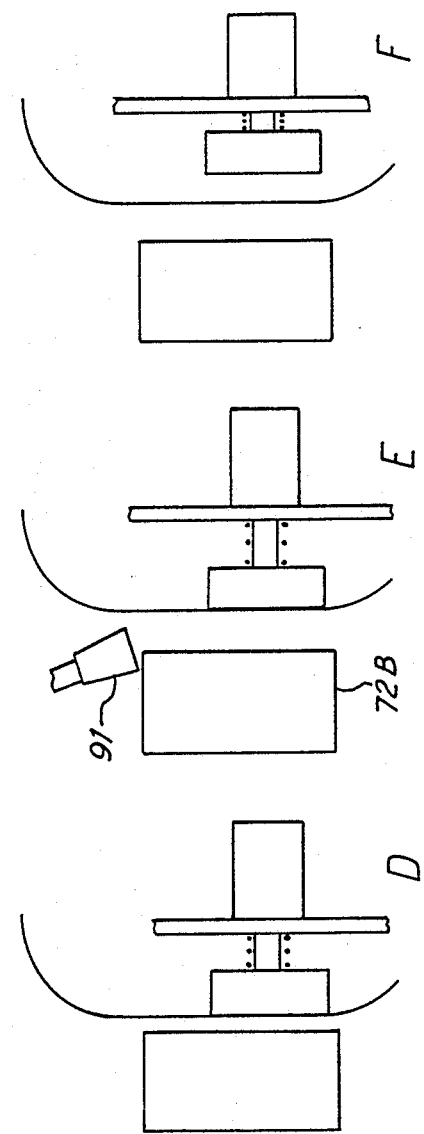
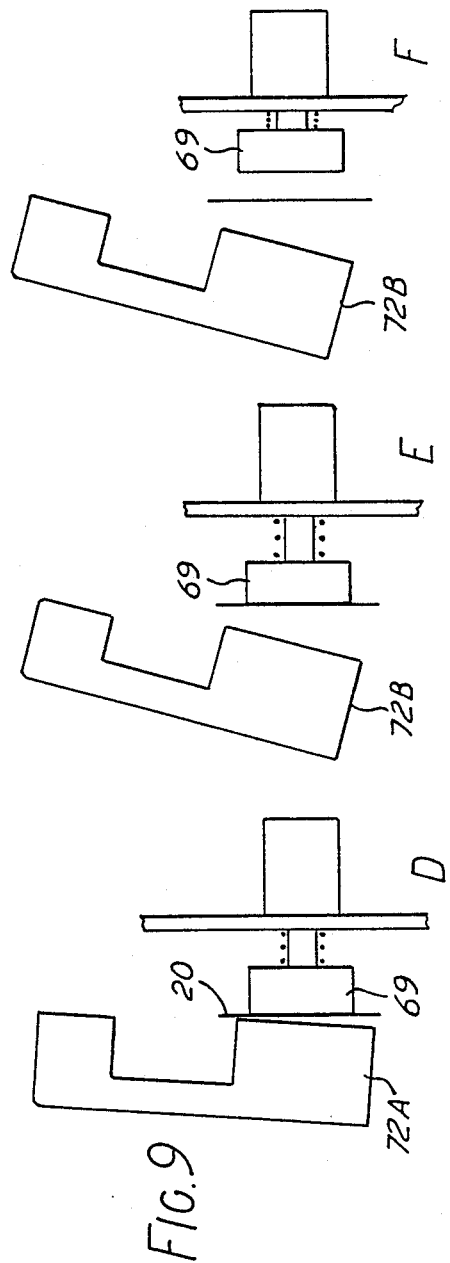
FIG.8
FIG.9

INTEGRATED SCANNER/PLOTTER FOR MICROFILM APERTURE CARDS

This invention concerns a microfilm aperture card handling machine.

In the field of card handling, many machines are known which have the individual capabilities of reading the hollerith (punched) data on the card, of scanning the microfilm image, of punching cards, and producing an image on microfilm. However, there are few if any handling machines capable of integrating these functions. Moreover, the process cameras traditionally used for producing microfilm images are inherently designed for operation on a more-or-less continuing basis e.g. at least every day, and if left unused for periods of weeks will not function because of problems with the operating life of the chemicals.

The invention aims to provide an integrated handling machine which by virtue of its design can serve an occasional user in all necessary modes. Accordingly, there is provided a microfilm aperture card handling machine having punched card reading and punching means, single means capable of both scanning and plotting microfilm images, a photographic developer station for developing plotted images, and control means enabling selective operation to read existing data carried by a card or to create data on a previously blank card. Such a machine is of acceptable size and cost by virtue of the combination in one unit of both scanner and plotter.

The need for an efficient photographic developer unit has been met, according to the invention, by a photographic developer unit having means for introducing a portion of photographic film in a position such that the emulsion area forms one internal surface of a chamber, means for injecting processing chemicals into the chamber, and means for evacuating the chemicals from the chamber.

The invention also includes an improvement in the image reproduction on microfilm, comprising a method of reproducing a two dimensional plotted image using a digital data stream representing a scanned original, wherein the pixels of the plotted image are produced by a modulated radiation spot which has a diameter larger than the pitch of the original scanning raster, comprising the step of altering the data stream so that it represents an enlargement or a reduction of the image area, which in the plotting step is reduced or enlarged respectively by the radiation spot so that the plotted image again matches the original in size.

These various inventions contribute to a card handling machine which is both improved in individual respects and also which meets a need for a multi-purpose machine capable of tasks previously only possible on several single-purpose machines.

In order that the inventions shall be clearly understood, exemplary embodiments thereof will now be described with reference to the accompanying drawings in which.

Figure 1:
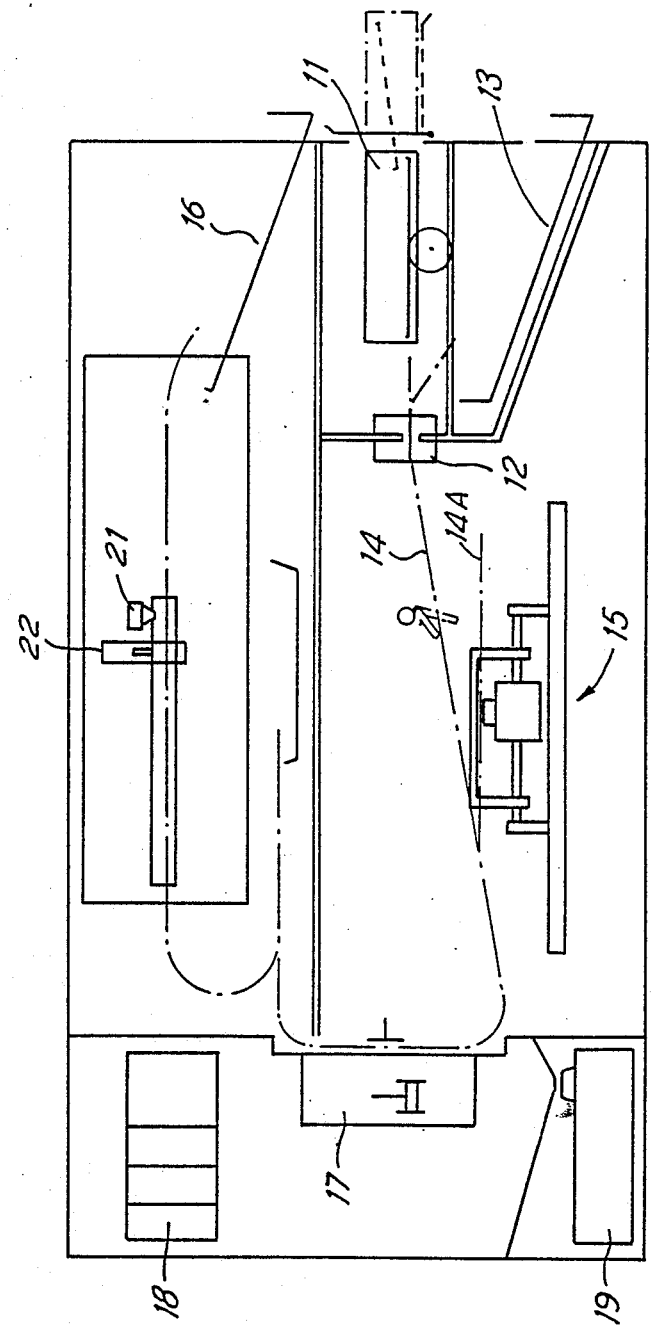
FIG. 1 shows a schematic side view of a microfilm aperture card handling machine.

FIG. 1 illustrates a complete card handling machine which is multi-function but nevertheless extremely compact. The card transport system shown in dash-dot lines is conventional, involving tracks and drive rollers, and is not described in detail. Cards fed into the machine may be either unexposed film cards carrying no punched data and no image on the photographic film in the aperture. Such cards must be fed from a light-tight cassette, and the machine equally is light-tight, at least until the emulsion has been fixed. Or the cards may be carrying punched data and associated microfilm images, and the machine be used for reading the data and digitising the image.

Cards are fed in at a manual input 10 or a cassette input 11 and pass first through a conventional punched card reader 12. In the event that the output of reader 12 shows that that particular card is not wanted, it can be reversed in direction back to a reject bin 13.

From reader 12 the card reaches a track section 14 lying above the scanner/plotter unit 15 which will be described in detail later. In order for the exposed or unexposed film to reach the unit 15, the track section 14 can be hinged downwards from its sloping position shown to a horizontal position 14A directly above the unit 15 in which the section of film can be brought into intimate contact with a curved transparent platen.

If the card is being scanned, the data derived from it, including that derived from the reader 12, can be passed to an electronic display, and/or can be stored for other purposes. It may for example be used later to produce a duplicate in the machine. After scanning, the card carried by the track section 14 is pivotted upwards and the transport resumed to take the card to the output hopper 16.

If the card is an unexposed one and the emulsion is to receive an image, this step is also carried out in the unit 15. After exposure, the section 14 again rises and the card is transported to a photographic processing unit 17. This is supplied from storage containers 18, and a drain container 19 receives the used liquids. The full operation of unit 17 is also described later. After processing the image, the card is moved again upwards towards the output hopper 16. On the way, it can be stopped for printing at a matrix print head 21 and punching at a data punch 22.

It will be seen that the machine provides all the necessary facilities to create or read microfilm aperature cards.

It does this preferably under the control of a control unit (not shown or further described) which may be a small computer with a V.D.U. for operator interaction and for displaying the data read from cards.

Figure 2:
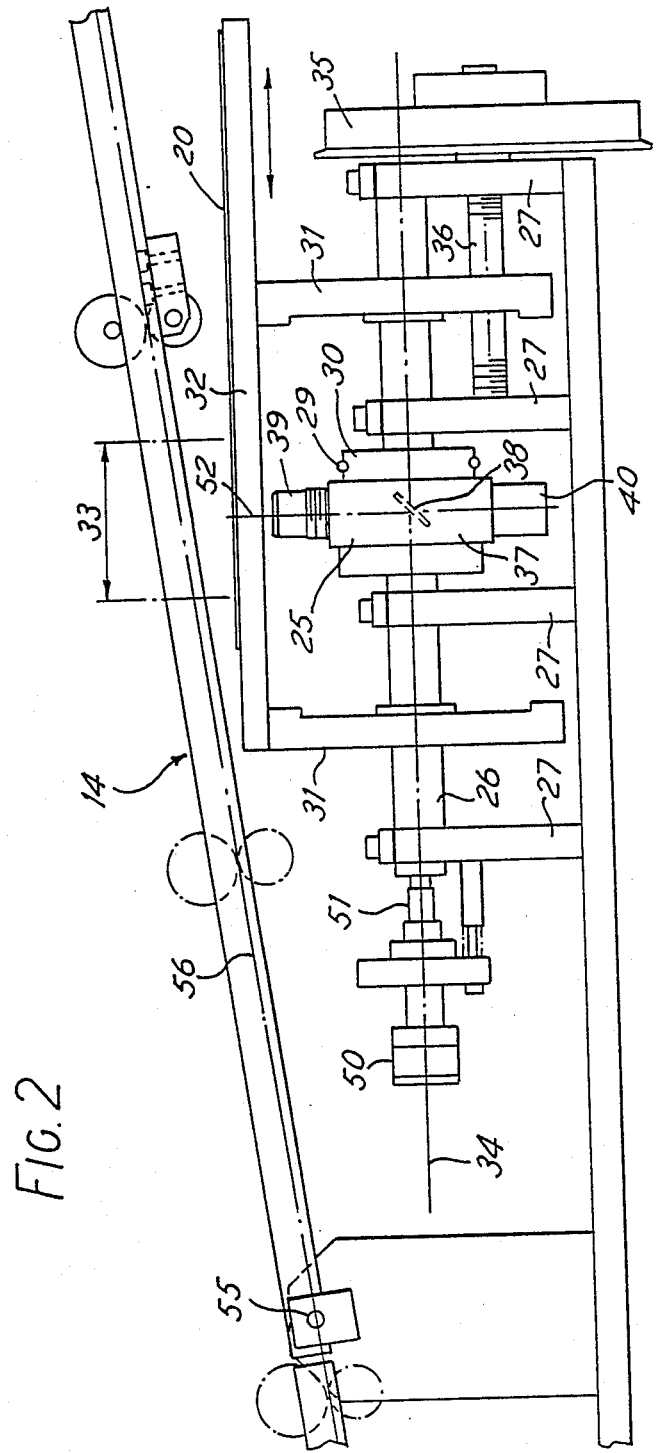
FIG. 2 shows a side view of the scanner/plotter with the card track above it.
Figure 3:
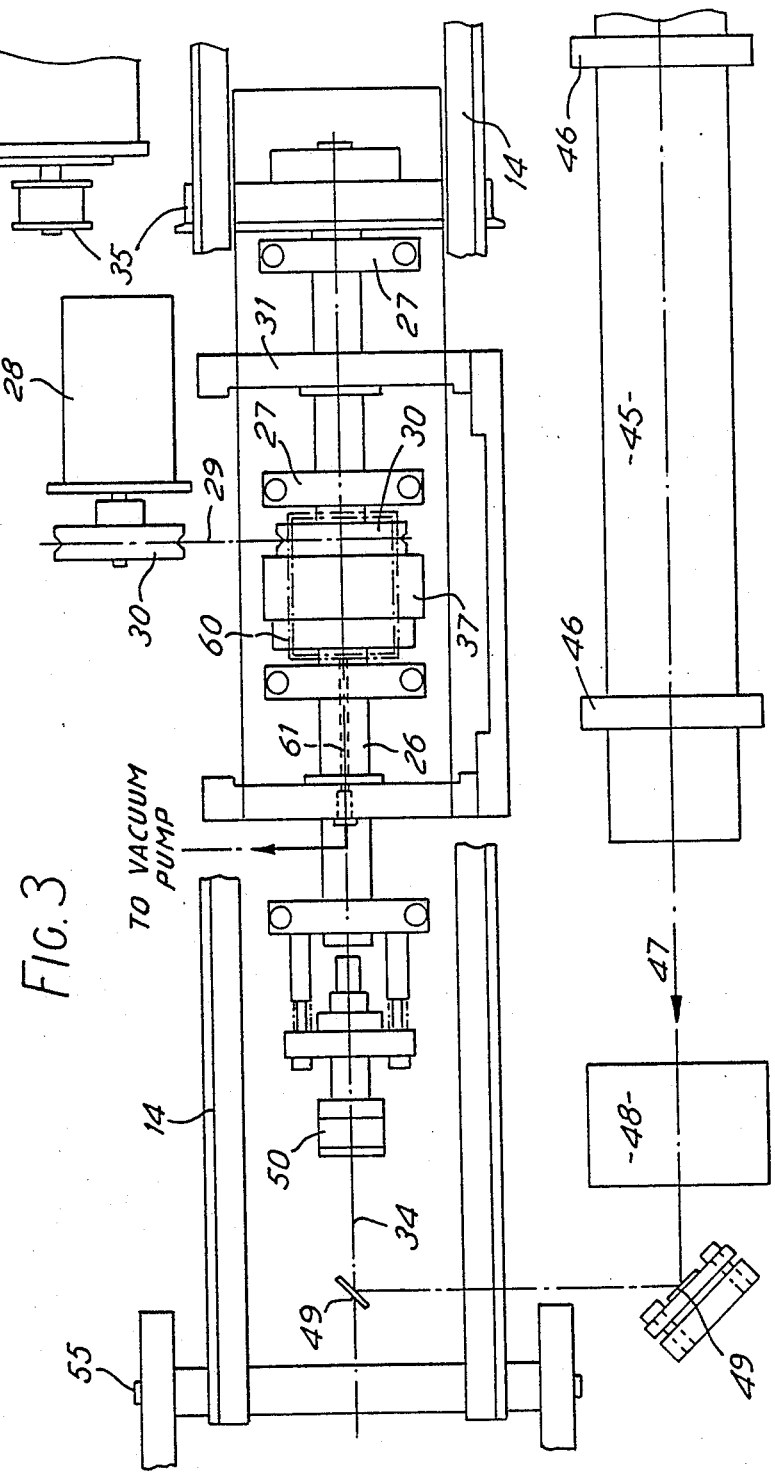
FIG. 3 shows a plan view of the scanner/plotter with the card track broken away.
Figure 4:
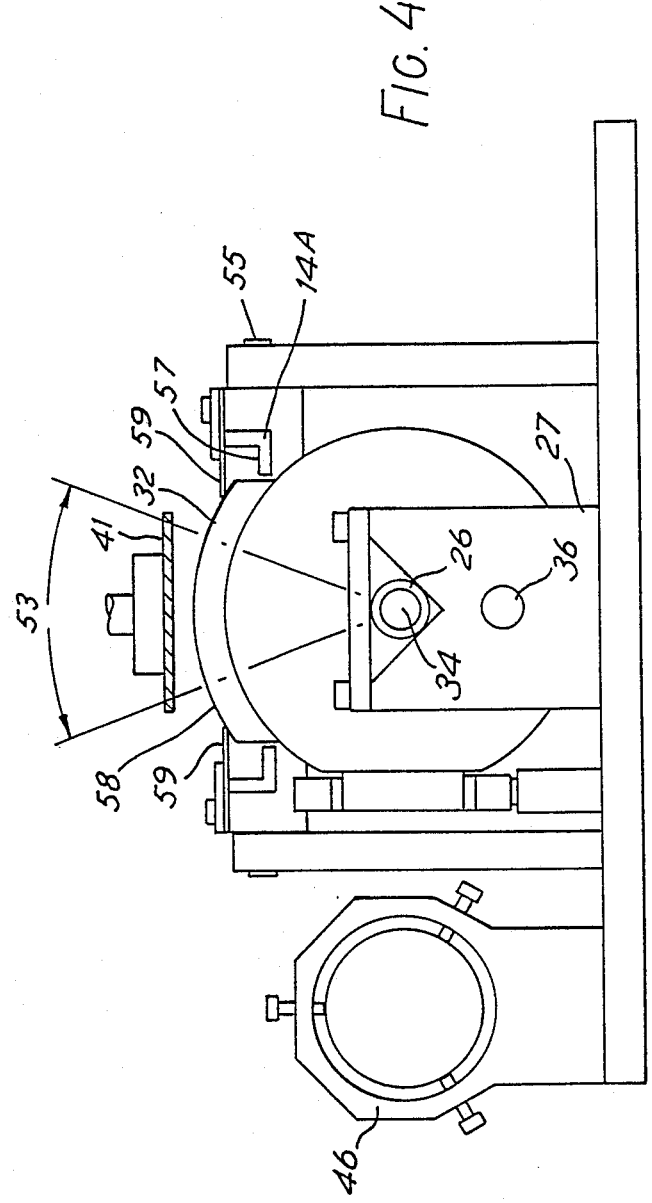
FIG. 4 shows a view from the right hand end in FIG. 2.

FIGS. 2, 3 and 4 show views of the scanner/plotter unit 15. A rotating head 25 pins on a hollow shaft 26 supported on four sturdy bearings 27. The head 25 is driven by a motor 28 via a belt 29 and pulleys 30. A platen frame 31 is supported for sliding movement on the shaft 26. The frame 31 supports a clear plastics, eg. Perspex (R.T.M) platen 32 which can move a distance 33 above the head 25 which is fixed longitudinally. The platen 32 is curved circumferentially about the axis 34 of the shaft 26, and has a size such that it can receive a single film mounted in an aperture card 20. The frame 31 and platen 32 are driven in discrete steps from one end of their travel to the other by a stepper motor 34, pulley wheels 35 and a lead screw 36, which extends through a tapped hole in the frame 31.

The head 25 is hollow and has a casing 37 containing an angled mirror 38 at its centre and directly in the line of the axis 34. There is an adjustable lens 39 on one side of the casing 37 and a counterbalance weight 40 on the other. The head can be driven at about 3500 r.p.m. Outside the platen 32 there is an enlongated photocell device 41 which is mounted on and above the hinged track section 14 in the diametral plane of the lens 39 on the head 25 (see FIG. 4).

A helium-neon laser 45 is mounted in centring supports 46 parallel with the axis 34. The laser beam in the direction of arrow 41 passes through a modulator 48, is reflected through 180° by adjustable mirrors 49 to reach the axis 34 of the shaft and passes through a lens system 50 and a 35 um pinhole 51 to reach the shaft 26 itself, along which it travels to the head 25. In the head, it is reflected radially outwards by mirror 38 through lens 39 either to expose an emulsion on the platen, or to pass through a data carrying transparency on the platen onto the photocell device 41.

When the head 25 rotates, a radial beam 52 of laser light swings about the axis 34, and in particular scans a straight line across the stationary platen within the arc 53. Before the next scan, the platen is stepped one increment by the stepper motor 34, thus subjecting the platen to a series of straight parallel sweep lines. When scanning an existing image using a constant power laser beam, the output of the photocell device 41 is a modulated signal which represents in serial form the light-/dark character of the successive parallel lines. This output can be digitized and stored, or displayed directly on a suitable screen.

If used for plotting, the modulator 48 receives a modulated signal from an external source of digital data, possibly derived from a previous scanning operation. The modulator 48 changes the laser beam from a constant intensity to a varying intensity representative of the successive raster lines of an image. This modulated beam falls in successive sweeps on an unexposed photographic emulsion on the platen. After development, to be described later, the emulsion will then carry the original image.

In a modification, it may be possible to provide two or more radial laser beams 52, and to step the platen between the scans, i.e. at each part revolution of the head 25. This divides the time needed to scan or plot an image by the number of beams employed.

In both the scanning and the plotting modes, there must be extremely accurate coordination between the input or output signals representing the image, the rotation of the head 25 and the longitudinal movement of the platen. This can be partly accomplished by a clock disk (not shown) which rotates with the head and the signal of which, possibly derived optically from the laser beam, is stored with the other data.

The mechanism for bringing a microfilm into position on the platen is illustrated in FIGS. 2 and 4. The track section 14 is hinged at pivots 55 and can be pivotted downwards to position 14A. The plane 56 of the card carrying the microfilm is then at 57 aligned with pivots 55 and well below the top surface 58 of the platen. However, nylon fingers 59 lying above the surface of the card and carried on the track 14 press the card into contact with the curved top surface 58 of the platen. A rectangular channel 60 is cut in that surface (see FIG. 3) and this is connected to a vacuum line via passage 61. With the track 14 lowered and the vacuum applied, the microfilm is intimately positioned on the platen. It then moves longitudinally with the platen, the fingers 59 sliding on the top surface of the card.

Figure 5:
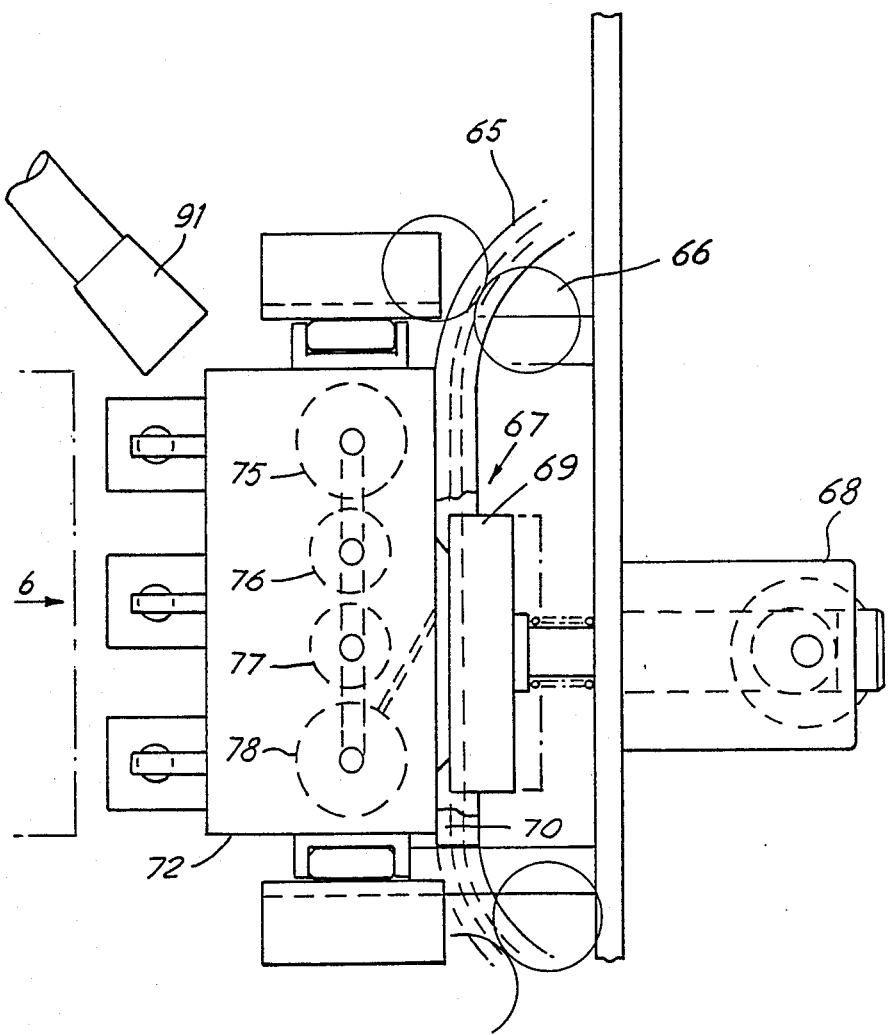
FIG. 5 shows a side view of the photographic film processing unit, seen from behind in FIG. 1.
Figure 6:
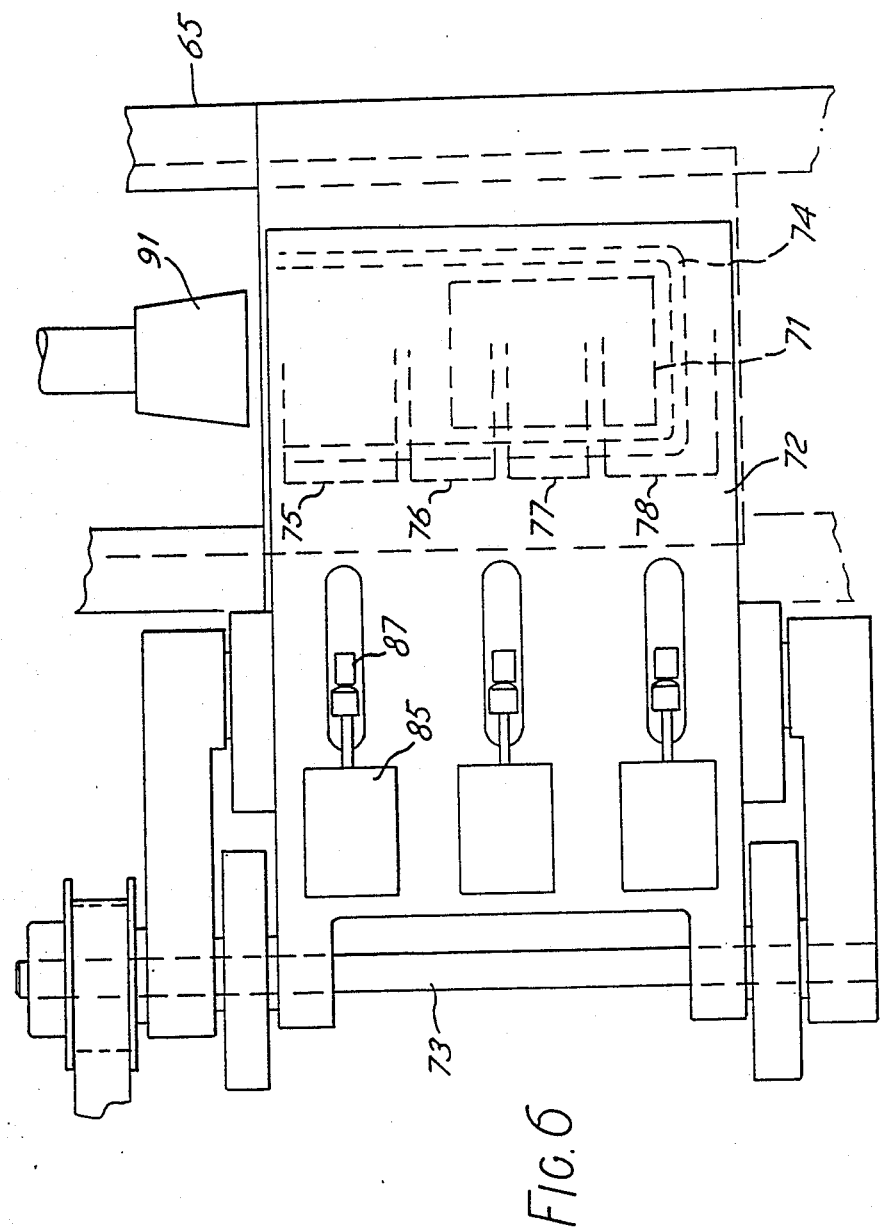
FIG. 6 is a view in direction of arrow 6 in FIG. 5.
Figure 7:
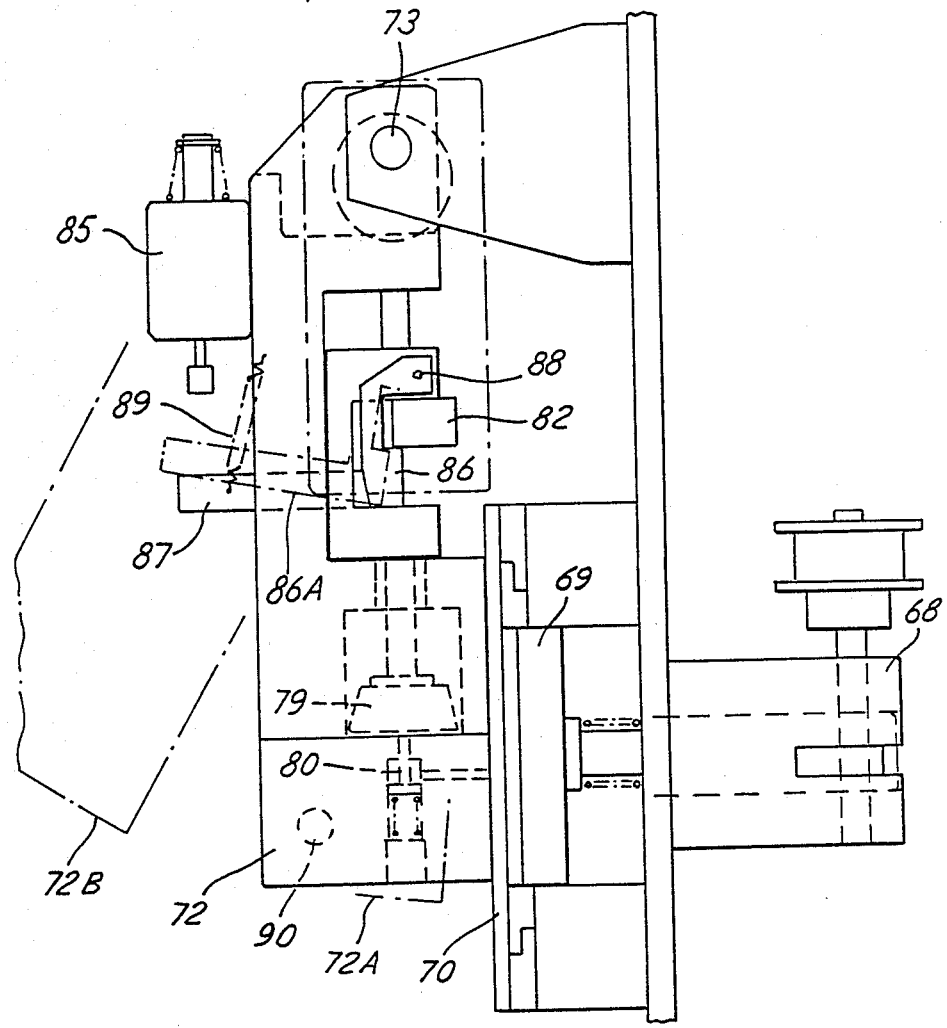
FIG. 7 is a view of the unit from above showing a piston actuated.
Figure 8:
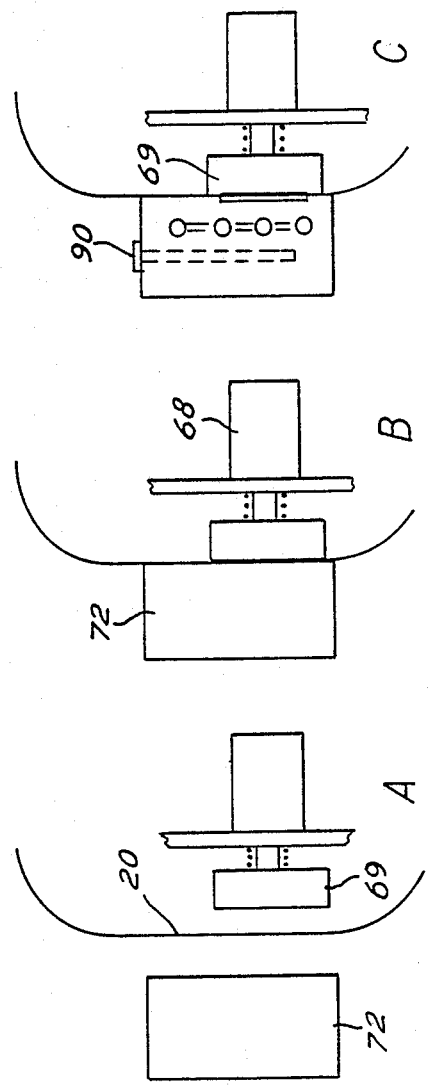
FIGS. 8A–8F show schematically the side view of the film processing unit in different operating states.
Figure 9:
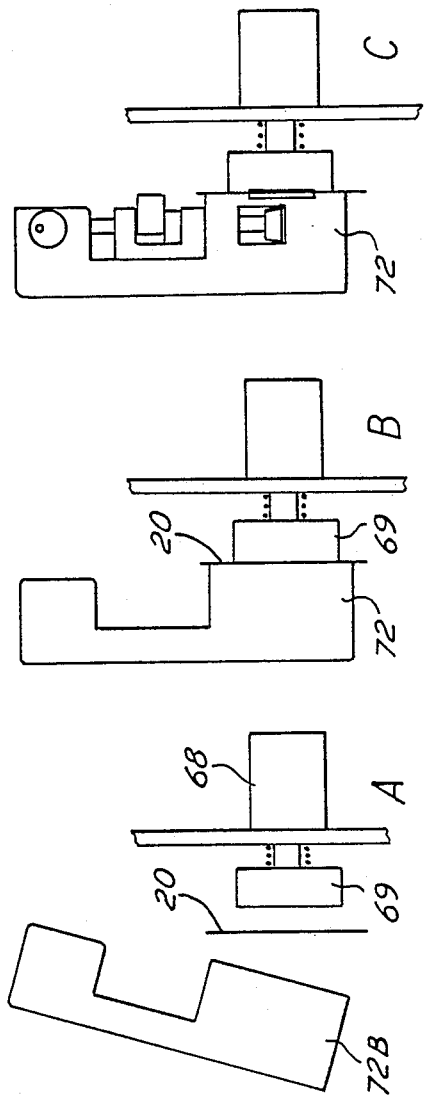
FIGS. 9A–9F show views from above corresponding to FIGS. 8A–8F.

FIGS. 5 to 7 illustrate the photographic processing unit, and FIGS. 8 and 9 illustrate its operating procedure. In FIG. 5, the unit is seen from behind compared with FIG. 1. An aperture card 20 carrying an exposed microfilm moves down the track 65 driven by rollers 66 until the microfilm reaches the processing area 67. A driver unit 68 with an eccentric cam moves a pressure pad 69 so that the film is clamped against a masking plate 70 having a window 71 which just frames the emulsion area to be processed. Thus the punched card does not have contact with liquid. On the other side of the masking plate from the emulsion is a cylinder block 72 which is pivotable on a rod 73 which extends vertically. The face of the cylinder block facing the masking plate has a U-shaped sealing strip 74 which surrounds the windows 71 on three sides. By this means there is formed a flat processing chamber, which is open only at the top and is bounded by the cylinder block as one face, the film emulsion as the other face, and the strip 74 together with the edges of the window 71 as the edges.

The cylinder block 72 has four cylinders 75 to 78 vertically one above the other, each containing a piston 79 and communicating via non-return valves 80 and channels 81 with the processing chamber. Only three actuators are required, one each for the top and bottom cylinders 75 and 78, and one for the middle two 76 and 77 which are operated always in unison. A single vertical drive bar 82 driven by a cam serves for all four pistons, since the drive to the pistons is transmitted selectively by the appropriate actuator. Each actuator comprises a solenoid 85 which controls the position of an interposer 86. This has a projecting arm 87 and is pivotted at 88. With the solenoid armature withdrawn as shown, a spring 89 can pull back the arm 87 and the interposer 86 is moved from the full line position in which it transmits drive from the bar 82 to the piston(s), to the dashed line position 86A in which the bar 82 moves but the piston(s) are not driven.

The cylinders are supplied under gravity feed as follows; 75 with wash water, 76 and 77 with two separate components of a developer, and 78 with fixer. The amount of liquid metered by the cylinders and injected into the developer chamber is in each case sufficient that the chamber fills up to a level higher than the top of the window 71. This requires about 4 cc of liquid each time, appreciably less than is required by known spray development systems. The cylinder block includes a heater element 90 which ensures the chemicals reach the correct temperature before use. The manifold for flow of the chemicals to the chamber is such that the wash water always passes through the whole length of the manifold and thus washes out all the other chemicals so that residues cannot crystallise out and clog the passages. In addition, the shape of the manifold is arranged so that complete mixing of the developer components takes place before they enter the developer chamber.

The cylinder block 72, as stated, can pivot to move it away from the masking plate 70. It can reach a position 72A in which the chamber opens to allow the liquid in it to drop out and flow to waste, or a wide open position 72B which allows a nozzle 91 to blow hot air onto the film emulsion so as to dry it.

FIGS. 8 and 9 show schematic views respectively corresponding to FIGS. 5 and 7 for the various operating states, as follows:

A. Cylinder block 72 is wide open: Card enters the processing unit; Pressure pad 69 clamps it.
B. A pre-charged cycle is performed with the cylinder block open to replace water in the manifold with mixed developer chemicals. Cylinder block 72 closes. The processing chamber is formed.
C. Closed position in which in succession developer chemicals, fixer chemicals, and four successive wash waters are injected by the pistons 79.
D. Between each injection, the cylinder block 72 is partially opened, to allow the liquid in the chamber to drop out and flow to the waste.
E. The cylinder block 72 is opened wide again and the nozzle 91 supplies hot air to dry the film.
F. Card clamp is released and the card is withdrawn.

The new machine is designed to be available to a user on an "on demand" basis, as well as for continuous production. This calls for the following machine/chemical characteristics to be used for processing silver halide films.

1. Rapid processing times.
2. No deterioration of solutions left in an inactive machine for a long period, say 3 months or more.
3. No crystalisation or drying out of solutions in the machine when left for 3 months or more.
4. Long Shelf life of processing solutions.

Rapid processing times call for a high energy developing solution with a pH of 12 or more, typically containing a metol/hydroquinone combination of developing agents, and a potassium or sodium hydroxide accelerating agent. Despite high concentrations of anti-oxidants such as sodium sulphite, formulae of this type tend to deteriorate rapidly and so have a short machine life.

This problem has been overcome by having a two solution developer. The first A essentially contains the developing agents and a preservative; the second B contains the alkaline accelerating agent. In addition, and as appropriate, the A or B solutions include Potassium Bromide as a restrainer, sequestering agents for the removal of calcium ions and glycols to maintain solubility of the ingredients at high concentrations and low storage temperatures. The solution A uses potassium metabisulphite as the preservation to form a very stable acidic solution.

Rapid development is achieved by small metered quantities of the A and B solutions being mixed thoroughly together just prior to entering the developing chamber. This combination has a pH of 12 or more and the acidic bisulphite ions from the A solution are neutralized by the alkali in the B solution to form the required sulphite ions in the developing chamber. The small quantity of combined A and B solutions are used once only to rapidly develop each single chip of microfilm.

Whilst separated the A and B solutions do not deteriorate when in open containers so machine solution lives of more than three months are obtained. Similarly shelf lives in excess of 12 months can be anticipated.

Rapid fixing is achieved with either fixing solutions based on ammonium thiosulphate or on sodium thiosulphate with the addition of ammonia ions in the form of ammonium sulphate or ammonium chloride.

More rapid fixing can be anticipated if the accelerator formula in the B solution is based on sodium hydroxide instead of potassium hydroxide. This is because the potassium ions carried over to an ammonium thiosulphate fixing solution form the less soluble potassium thiosulphate, and thereby slow down the fixing cycle.

The design of the metering system combined with the fact that the wash solution occurs at the end of each cycle are factors that ensure that solutions remain in a "ready" liquid state during periods when the machine is idle. Other means that prevent drying out or crystalisation of chemicals include floating lids on the open processing containers and automatic level detectors that warn operators to top up solutions to above a minimum safe level.

To achieve a pH of 12 or more with the mixed A+B solution (when the A solution necessarily has a low (acid) pH) means that the B solution alone must have a pH above 12. The bottle seal and its method of use in the machine are designed to ensure little risk to unskilled operators of being subjected to splashes of such an alkaline corrosive substance.

In order to obtain good quality plots from a raster photoplotter, it is necessary that the resolution of the raster data i.e. the frequency of the raster step, is high compared with the smallest features which it is required to plot. Inadequate resolution in any photoplotter is most easily detected by looking at the edge of straight lines which are almost but not exactly parallel to one axis of the plot. The effect of inadequate resolution is to produce a stepping effect on the line edge commonly known as "jaggies". As the resolution of the data is increased, this effect diminishes to the point where it eventually becomes indistinguishable.

The diameter of the light spot used for exposing the film is also a factor which effects quality, but here the only requirement is that the light spot diameter should be at least as small as the minimum line width which it is required to portray. Indeed it is a positive advantage to have the spot diameter larger than the data resolution, so that successive lines of scan overlap and an even exposure is produced on continuous light areas such that the raster or line pattern is not evident. Typically the ratio between the spot diameter and resolution step is between 2:1 and 4:1.

There is an undesirable effect, however, which is introduced by having the spot diameter larger than the resolution step. If data truly representing the original image is fed directly to the light spot modulator, then the plot which is reproduced is not an accurate reproduction of the data which is used to produce it. This is because the beam overlaps at the edges of light areas making them larger than the real image.

Figure 10:
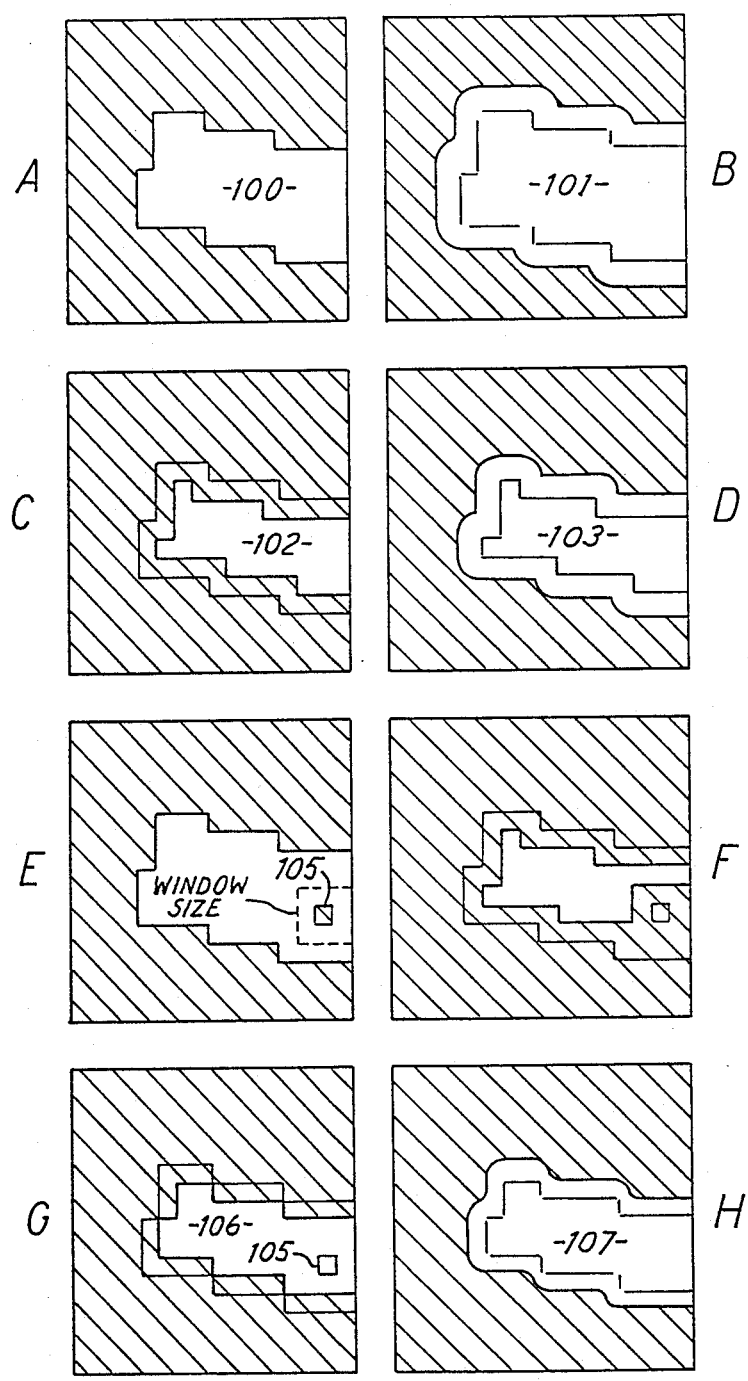
FIGS. 10A–10H illustrate the method of increasing the accuracy of the plotted image.

This undesirable effect is illustrated in FIGS. 10A and 10B. The light area 101 is larger than that 100 defined by the data.

FIGS. 10C and 10D illustrate how this effect can be corrected. The data for area 100 of the correct size is modified either before storage, or before it is applied to the plotter so that the apparent area 102 is smaller than the area 100 by a given amount, chosen such that, when plotted, this reduced area is enlarged again to 103, which is a close approximation of the original 100.

Technically, the reduction is achieved by examination of the digital data representing a square with its centre at the point being considered. The square has a size approximately equal to the size of the light spot. If any part of the window is dark, then the point is considered dark and the data registers this.

However, this method of correction introduces a new problem, namely that the new system becomes very susceptible to random noise in the data file, and in fact magnifies it. The effect is shown in FIGS. 10E and 10F. If the image or the uncorrected data has a single small point 105 which is dark, the correct data used for plotting has a greatly increased area of dark. This will produce a completely incorrect plot. So the simple algorithm used to produce the corrected date is inadequate.

A different one is needed which will cause the noise represented by a single dark point to be eliminated, while the edge correction needed to be achieved. This will depend upon the ratio between the light spot size and the raster line step. For a spot which has a diameter three times that of the line spacing i.e. the window is effectively a matrix of 3×3 spots, a suitable algorithm is as follows: if any two points in the same row or column of the window are dark, then the centre point is considered dark. The area 106 in Fig 10G is thus the corrected form of the data using this algorithm, and the single spot 105 is eliminated. The plotted reproduction is shown in FIG. 10H, and it will be seen to be an acceptably accurate area 107 results, from which single spots of noise have been cancelled.

We claim:

1. A microfilm aperture card handling machine having punched card reading and punching means, single means capable of both scanning and plotting microfilm images, a photographic developer station for developing plotted images, and control means enabling selective operation to read existing data carried by a card or to create data on a previously blank card.

2. A card handling machine as claimed in claim 1 wherein said single means comprises a platen for receiving a microfilm in a cylindrical configuration, and scanning means which allow a radiation beam to fully scan the area of the microfilm.

3. A card handling machine as claimed in claim 2 wherein the scanning means include a longitudinally movable carriage carrying the platen and radiation beam means at the axis of the platen which produces a circumferential scanning beam.

4. A card handling machine as claimed in claim 2 wherein the beam cooperates with a radiation sensitive device outside the platen in order to read a transparency microfilm image.

5. A card handling machine as claimed in claim 1 wherein a card transport path extends between a card input, said single means, the developer station, and the card reading and punching means.

6. A card handling machine as claimed in claim 5 wherein the path allows cards optionally to reach said single means.

7. A card handling machine as claimed in claim 6 wherein a section of the transport path hinges to bring a card into functional relationship with the single means without disengaging it from the path.

8. A card handling machine as claimed in claim 1 wherein the developer station has means for introducing a portion of photographic film in a position such that the emulsion area forms one internal surface of a chamber, means for injecting processing chemicals into the chamber, and means for evacuating the chemicals from the chamber.

9. A card handling machine as claimed in claim 8 wherein said processing chemicals are gravity fed to the injection means, and are evacuated under gravity.

10. A card handling machine as claimed in claim 8 wherein the transport path extends through the station and the emulsion area is clamped in liquid tight fashion to close the chamber without the card leaving the path.

11. A card handling machine as claimed in claim 1 wherein the scanned image is digitised and fed to peripheral apparatus for storage and/or visual display.

12. A card handling machine as claimed in claim 11 having an image improvement means using a digital data stream representing a scanned original, wherein the pixels of the plotted image are produced by a modulated radiation spot which has a diameter larger than the pitch of the original scanning raster, comprising the step of altering the data stream so that it represents an enlargement or a reduction of the image area, which in the plotting step is reduced or enlarged respectively by the radiation spot so that the plotted image again matches the original size.

13. A method of reproducing a two dimensional plotted image using a digital data stream representing a scanned original, wherein the pixels of the plotted image are produced by a modulated radiation spot which has a diameter larger than the pitch of the original scanning raster, comprising the step of altering the data stream so that it represents an enlargement or a reduction of the image area, which in the plotting step is reduced or enlarged respectively by the radiation spot so that the plotted image again matches the original in size.

14. A card handling machine as claimed in claim 3 wherein the beam cooperates with a radiation sensitive device outside the platen in order to read a transparency microfilm image.

15. A card handling machine as claimed in claim 9 wherein the transport path extends through the station and the emulsion area is clamped in liquid tight fashion to close the chamber without the card leaving the path.

* * * * *